(12) United States Patent
Bharti et al.

(10) Patent No.: US 10,834,589 B2
(45) Date of Patent: Nov. 10, 2020

(54) DIGITAL DATA TRANSFER BETWEEN DEVICES

(71) Applicant: INTERNATIONAL BUSINESS MACHINES CORPORATION, Armonk, NY (US)

(72) Inventors: Harish Bharti, Pune (IN); Abhay K. Patra, Pune (IN); Sarbajit K. Rakshit, Kolkata (IN); Sandeep Sukhija, Noida (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 15/795,416

(22) Filed: Oct. 27, 2017

(65) Prior Publication Data

US 2019/0132732 A1    May 2, 2019

(51) Int. Cl.
  *H04L 29/06*     (2006.01)
  *H04W 12/06*     (2009.01)
  (Continued)

(52) U.S. Cl.
  CPC .............. *H04W 12/06* (2013.01); *G02C 7/04* (2013.01); *G02C 11/10* (2013.01); *H04L 63/083* (2013.01);
  (Continued)

(58) Field of Classification Search
  CPC ............ H04W 12/06; H04W 12/00508; G02C 11/10; G02C 7/04; H04L 63/083;
  (Continued)

(56) References Cited

U.S. PATENT DOCUMENTS

2008/0114988 A1    5/2008  Lisanke et al.
2012/0110470 A1    5/2012  Misty et al.
(Continued)

FOREIGN PATENT DOCUMENTS

WO    200127723 A1    4/2001

OTHER PUBLICATIONS

"Pasteasy—Copy-and-paste Between Your Mobile and Computer", Frequently Asked Questions, [retrieved on Jul. 30, 2017]. Retrieved from the Internet: < URL: https://www.pasteasy.com/faq.php>, 1 pg.

(Continued)

*Primary Examiner* — Khoi V Le
(74) *Attorney, Agent, or Firm* — Michael O'Keefe; Matthew M. Hulihan; Heslin Rothenberg Farley & Mesiti PC

(57) ABSTRACT

A method for transferring digital data from a source to a target device, each of the source and target devices including a respective user interface. The method receives a user selection of digital data on the source device via a user interface. The method authenticates the user on the source device. The method, based on recognizing a user selection of target input field(s), of an interface of the target device, to which the digital data is to be provided as input, authenticates the user on the target device and verifies that a common user has authenticated with the source device and the target device. The method transfers the digital data to the target input field(s) of the interface of the target device.

20 Claims, 9 Drawing Sheets

(51) Int. Cl.
   G02C 7/04   (2006.01)
   G02C 11/00  (2006.01)
   *G06F 3/01*    (2006.01)
   *G06Q 30/06*   (2012.01)
   *H04M 1/725*   (2006.01)
   *G06F 3/0484*  (2013.01)

(52) U.S. Cl.
   CPC .......... H04L 63/0861 (2013.01); *G06F 3/013* (2013.01); *G06F 3/017* (2013.01); *G06F 3/04842* (2013.01); *G06Q 30/0641* (2013.01); *H04M 1/7253* (2013.01); *H04M 2201/42* (2013.01)

(58) Field of Classification Search
   CPC . H04L 63/0861; G06F 3/017; G06F 3/04842; G06F 3/013; G06F 3/04883; G06F 1/163; H04M 2201/42; H04M 1/7253; H04M 2250/64; G06Q 30/0641
   See application file for complete search history.

(56) References Cited

U.S. PATENT DOCUMENTS

| | | | | |
|---|---|---|---|---|
| 2014/0068725 | A1* | 3/2014 | Zhang | G06F 21/44 726/5 |
| 2015/0135093 | A1* | 5/2015 | Zhou | G06F 3/0486 715/748 |
| 2015/0215775 | A1* | 7/2015 | Burch | H04W 12/04 713/150 |
| 2015/0281411 | A1* | 10/2015 | Markus | G02C 7/04 455/556.1 |
| 2016/0182507 | A1* | 6/2016 | Zhang | H04L 63/0861 726/7 |
| 2016/0227446 | A1 | 8/2016 | Rodzevski et al. | |
| 2017/0116657 | A1* | 4/2017 | Oh | G06F 3/013 |
| 2018/0210235 | A1* | 7/2018 | Boss | G02C 11/10 |

OTHER PUBLICATIONS

"Copy Paste Multiple Items", [retrieved on Jul. 30, 2017]. Retrieved from the Internet: < URL: http://www.copypastesoftware.net/copy-paste-multiple-items/>, 2 pgs.

Yadron, D., "Samsung Patent Reveals 'Smart' Contact Lens With Built-In Camera", [retrieved on Jul. 30, 2017]. Retrieved from the Internet: < URL: https://www.theguardian.com/technology/2016/apr/06/samsung-smart-contact-lens-camera-patent)>, Apr. 6, 2016, 2 pgs.

Iyer, et al., "Inter-Technology Backscatter: Towards Internet Connectivity for Implanted Devices", SIGCOMM '16, Florianopolis, Brazil, Aug. 22-26, 2016, 14 pgs.

Groenheijde, M., "Samsung is Working on Smart Contact Lenses, Patent Filing Reveals", [retrieved on Aug. 24, 2017]. Retrieved from the Internet: < URL: https://www.sammobile.com/2016/04/05/samsung-is-working-on-smart-contact-lenses-patent-filing-reveals/)>, Apr. 5, 2016, 4 pgs.

Otis B., et al., "Introducing Our Smart Contact Lens Project", Official Google Blog, [retrieved on Aug. 24, 2017]. Retrieved from the Internet: < URL: https://googleblog.blogspot.in/2014/01/introducing-our-smart-contact-lens.html>, Jan. 16, 2014, 5 pgs.

Purcher, J., "Apple Invents Wireless Pairing between Devices using Biometrics", Patently Apple, [retrieved on Aug. 24, 2017]. Retrieved from the Internet: < URL: http://www.patentlyapple.com/patently-apple/2014/03/apple-invents-wireless-pairing-between-devices-using-biometrics.html>, Mar. 6, 2014, 7 pgs.

Seals, T., "PwC: Device-side Biometrics a Key to Personal Privacy", [retrieved on Aug. 24, 2017]. Retrieved from the Internet: < URL: http://www.infosecurity-magazine.com/news/pwc-deviceside-biometrics-a-key-to/>, May 13, 2016, 3 pgs.

"What is Li-Fi Technology?" Lifi Research and Development Centre, [retrieved on Aug. 24, 2017]. Retrieved from the Internet: < URL: http://www.lifi-centra.com/about-li-fi/what-is-li-fi-technology/>, 3 pgs.

Langley, H., "Google's smart contact lenses just went from concept to reality", TechRadar, [retrieved on Aug. 24, 2017]. Retrieved from the Internet: < URL: http://www.in.techradar.com/news/wearables/Googles-smart-contact-lenses-just-went-from-concept-to-reality/articleshow/48579063.cms>, Aug. 21, 2015, 6 pgs.

Mercer, C., "What is Li-Fi? | The ultimate definition of Li-Fi", Techworld, [retrieved on Aug. 24, 2017]. Retrieved from the Internet: < URL: http://www.techworld.com/big-data/what-is-li-fi-everything-you-need-know-3632764/>, Jul. 20, 2017, 6 pgs.

Tenderich, A., "NewsFlash: Google is Developing Glucose-Sensing Contact Lenses!", Healthline, [retrieved on Aug. 24, 2017]. Retrieved from the Internet: < URL: http://www.healthline.com/diabetesmine/newsflash-google-is-developing-glucose-sensing-contact-lenses>, Jan. 16, 2014, 8 pgs.

"How to Share a Clipboard Between Any Computer and Smartphone", [retrieved on Aug. 24, 2017]. Retrieved from the Internet: < URL: http://www.technorms.com/44097/copy-and-paste-text-between-computer-and-android-iphone>, 7 pgs.

Abilash, A., "Copy Paste Text Between Android & PC | USB,Bluetooth,WiFi", [retrieved on Aug. 24, 2017]. Retrieved from the Internet: < URL: http://thetechgears.com/copy-paste-text-between-android-phone-and-pc-through-usb-bluetooth-wifi/>, Jan. 5, 2015, 4 pgs.

Zibreg, C., "It's now technically possible to embed a fingerprint scanner beneath a smartphone display", [retrieved on Aug. 24, 2017]. Retrieved from the Internet: <URL: http://www.idownloadblog.com/2016/05/03/lg-in-cell-fingerprint-scanned>, May 3, 2016, 6 pgs.

Mell, Peter, et al., "The NIST Definition of Cloud Computing", NIST Special Publication 800-145, Sep. 2011, Gaithersburg, MD, 7 pgs.

* cited by examiner

DIGITAL DATA TRANSFER BETWEEN DEVICES

BACKGROUND

During various online and other transactions, it is a common practice for a user to input information to an interface. Such information may include sensitive information like a passport number, date of birth, password, bank account number, or customer identity number (ID), as examples. Some users may need to look up this information using another device, read the information from that device, and supply the information in the interface of the requesting device. In these situations, it is common for the user to view the information on a first mobile device and input the information to an application on second mobile device. However, problems can arise in the user reading the information from one device and then typing it on another device, for instance the user may mistakenly mistype the information. In some instance, the information may be so critical that providing wrong input to the target device can lead to financial, legal, or other problems.

SUMMARY

Shortcomings of the prior art are overcome and additional advantages are provided through the provision of a computer-implemented method for transferring digital data from a source device to a target device, each of the source and target devices including a respective user interface. The method receives a user selection of digital data on the source device via a user interface of the source device. The method authenticates the user on the source device. The method, based on recognizing a user selection of at least one target input field, of an interface of the target device, to which the digital data is to be provided as input, authenticates the user on the target device and verifies that a common user has authenticated with the source device and the target device. The method transfers the digital data to the at least one target input field of the interface of the target device.

Further, a computer system is provided that includes a source device and a target device and is configured to perform a method for transferring digital data from the source device to the target device, each of the source and target devices including a respective user interface. The method receives a user selection of digital data on the source device via a user interface of the source device. The method authenticates the user on the source device. The method, based on recognizing a user selection of at least one target input field, of an interface of the target device, to which the digital data is to be provided as input, authenticates the user on the target device and verifies that a common user has authenticated with the source device and the target device. The method transfers the digital data to the at least one target input field of the interface of the target device.

Yet further, a computer program product is provided that includes a computer readable storage medium readable by one or more processors and storing instructions for execution by the one or more processors is provided for performing a method for transferring digital data from a source device to a target device, each of the source and target devices including a respective user interface. The method receives a user selection of digital data on the source device via a user interface of the source device. The method authenticates the user on the source device. The method, based on recognizing a user selection of at least one target input field, of an interface of the target device, to which the digital data is to be provided as input, authenticates the user on the target device and verifies that a common user has authenticated with the source device and the target device. The method transfers the digital data to the at least one target input field of the interface of the target device.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
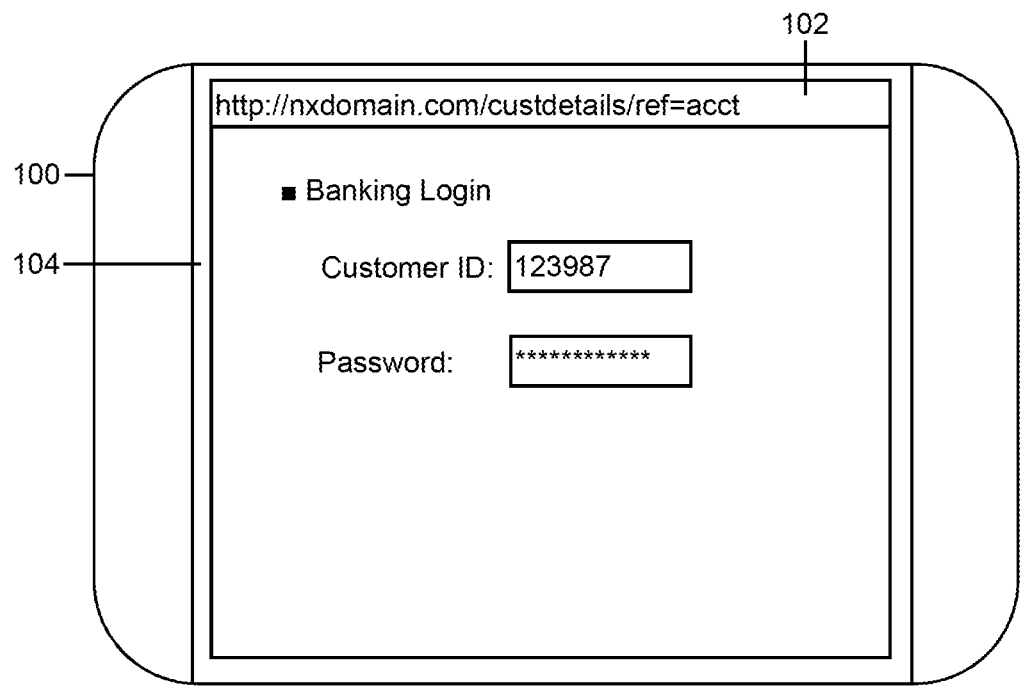
FIGS. 1-3 depict example environments having source and target devices to incorporate and use aspects described herein.
Figure 1:
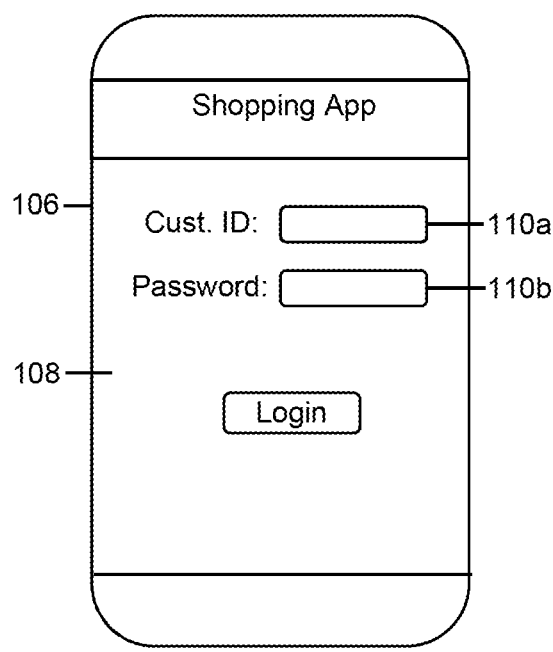

Described herein are new ways to enable the secure and rapid transfer of digital data between source and target devices leveraging authentication, for instance fingerprint and/or retina-scan biometric-based authentication. In some examples, the user accomplishes this absent and without involvement or reliance on security key(s) or cryptographic exchanges between the two devices. Additionally, the user can securely and accurately transfer sensitive information between devices absent and without reading or remembering the digital data.

A framework/method described herein provides transfer of information (e.g. sensitive information) from a source device, which may be a computer system such as a mobile computer, to a target device, which may also be a computer system such as a mobile computer, without the user remembering and manually typing that information, in which the method authenticates the user before completing the transfer of information to the target. By way of specific example, assume a user wants to fill a digital form presented on a user interface of a first (target) device, for instance a tablet target device. The digital form requires input of a passport number and valid from/to dates. The user stores and/or accesses this information on another (source) device via an interface of the source device, for instance a smartphone. This framework enables user to select the desired digital content/data from the source device—the smartphone in this scenario. During or based on the user's selection of the content from the source device, the system can authenticate the user via fingerprint and/or eye retina-scan authentication. The user can invoke sending of the content to the target device (tablet) through a smart eyewear device, such as smart contact lens(es) or smart glasses, for instance using a Li-Fi communication channel, or through a direct source-to-target device wireless communication path, such as via Bluetooth or Wi-Fi connection.

The selected and transferred content can be inserted into the target input field(s) on the target device, the target input field(s) being selected or otherwise in-focus on the target device. One way of identifying a target field is based on the user's gaze, i.e. detecting the user looking into a specific field of the user interface of the target device. Another way of identifying a target field is by recognizing user selection of the field with the user's finger. Based on recognizing a user selection of target field(s), an authentication occurs between the user and the target device to authenticate the user on the target device and ensure that data is being transferred by invocation by the proper user, e.g. the one who performed the selecting on the source device. Then the target device receives the information from the source device either directly via peer-to-peer communication technology such as Bluetooth or wireless, or via a smart contact lens (or other smart eyewear device) using, e.g. a Li-Fi data transfer.

Provided is secure and rapid transfer using biometric authentication (fingerprint, retina scan) by the user without any security key or cryptography involved between the devices. This can be used to transfer sensitive information from one device to another using smart contact lens(es) and without the user typing/inputting the data manually, which can reduce the risk of providing wrong information.

In some embodiments, the user can associate different portions of digital data to be copied with different selection characteristics (fingers/fingerprints, eye gestures, etc.), which allows the user to group multiple selection and transfer activities, for instance when multiple pieces of information are to be transferred.

Aspects described herein are distinct from approaches relying on cryptography and/or security keys made of biometric data for data transfer, approaches that fail to leverage high speed and secure data transfer using, e.g., Li-Fi communication technology, and/or approaches that fail to provide for using different biometric authentication or other selection characteristics for different content, and copying multiple/combinations of content.

In example Li-Fi communication technology, light-emitting diode(s) (LED) transfer data at very high speed. LED lights may be incorporated into smart contact lenses. For instance in some approaches, smart contact lenses may be used for detecting glucose levels, and LED lights could illuminate to indicate that glucose levels have crossed above or below certain thresholds. Consequently, LED lights can be integrated into smart contact lenses and leveraged to support the transfer of data via Li-Fi. Additionally or alternatively, communication over Bluetooth, near-field, Wi-Fi, or other wireless communications channels may be used to transfer data between devices.

FIG. 1 depicts an example environment having source and target devices between which a transfer of digital data occurs in accordance with aspects described herein. Source device 100 is a tablet computer displaying a webpage 102 on a user interface 104 of tablet 100. The webpage 102 displays customer banking login information, specifically a customer ID '123987" and a password shown in asterisks.

The customer ID and password constitute two portions of digital data that in this example a user wishes to enter into a shopping application on the user's smartphone, target device 106. Smartphone 106 presents the shopping app on a user interface 108 thereof. The shopping app requires customer ID and password information and includes a respective input field (110*a*, 110*b*) for each piece of information. The user is to supply the user's customer ID and password to successfully login to the application.

As explained in further detail below, the user may proceed through a process to transfer the customer ID and password digital data portions to the target device. The user opens on the tablet 100 the banking login webpage (in this example) where the digital data is stored/presented. The user selects the digital data on the source device via the user interface 104 and engages in an authentication on the source device, for instance via a fingerprint scan and/or via a retina scan, as examples. The user then selects the target input fields 110*a*, 110*b* to initiate the data transfer to the target device. The user gazes into a target input field (in an example where a smart eyewear device such as smart contact lenses or smart glasses are used) or touches the target input field with the user's finger to initiate the transfer to the source device. Another user authentication, this time on the target device 106, may occur, again via a fingerprint scan and/or via a retina scan, as examples. For security reasons, the authentications on the source and target devices can ensure (i) that the user is authorized to effect a transfer of the data, and (ii) that it is the same user who is copying and pasting the information.

The transfer of the digital data can occur directly between the source and target, or via an intermediary device, for example a smart contact lens or other eyewear device. In an example of the latter scenario, the source device transmits and the smart contact lens receives digital data over a Li-Fi communication path between the source device and the smart contact lens. Then, the smart contact lens transmits and the target device receives the digital data over another Li-Fi communication path between the smart contact lens and the target device.

Further details are now provided of aspects of the above. In reading the digital data from the source device, initially the user opens the desired information on the source device. Once the document, webpage, app, etc. is opened, the user selects the particular content that the user desires to pass on to the target device.

There are various ways to select the digital content from the source device. As one example, the user performs a well-known activity of touching the text or other content to be copied on the screen (touch and hold finger for a duration of time).

As another example, the user selects text or content by swiping a finger over all of the desired content and ending with a pause of a given duration (e.g. two seconds) on a last portion of content to copy.

In some examples, the user can capture multiple portions of digital data by repeating multiple touches/swipes on different pieces of content. Using the example of FIG. 1, the user might first select the customer ID value and then select the password value. Both pieces of data could be read-up and built/stored as a concatenated, delimited string, as one example If the user is wearing smart contact lens or a wearable glasses device, then these devices (lens/glass) can observe gestures, e.g. finger/hand gestures or eye gestures, by the user to come to know that user has initiated an action to copy the text. Smart eyewear may include camera(s) that capture video or images of the environment. This media may be analyzed to identify gestures. Additionally or alternatively, the smart eyewear may include other sensors to sense user gestures. Eye gestures including blinking an identifiable number of times or gazing/staring may be observed and identified by the smart eyewear.

During and/or based on a user selecting content on the source device, the source device can authenticate the user via fingerprint scan and/or eye-retina scanning on the source device. While authenticating the user, the system (e.g. source device) can create an audit of the activity, for instance to store user information, date/time of the activity, source device information, and content identification or information, as examples.

At some point, the user indicates the target device. For instance, the user can view field(s) of the target device into which the user desired to copy the information from the source device. In some examples, the target device and/or smart eyewear uses an eye-tracking facility to recognize an instruction to transfer the source content. In examples that do not involve smart eyewear, the user can manually gesture and/or place a finger on a target field and select an option to paste content copied from source device.

The system (e.g. source device and/or target device) can update the audit log on the source device with target device information, date/time of activity, or any other desired information. In this regard, there may be a communication channel between the source and target devices to exchange such information, for instance a direct communication channel like a Bluetooth or Wi-Fi channel, or an indirect communication channel, through at least one other device, for instance a smart eyewear device.

At some point, for instance based on recognizing user selection of target input field(s) of an interface of the target device, the target device can authenticate the user, for instance via a fingerprint scan or retina scan. This can ensure that the target device is receiving the information from/based on the person who is expected to enter that information, e.g. the person who authenticated with the source device.

The digital data can be transferred to the target input field(s) of the interface of the target device, for instance directly through a Bluetooth or other wireless channel, or, if a smart eyewear device is involved, via the smart eyewear. The source and target devices can each include the hardware and software to read and write from and to the smart eyewear.

As noted, there may be multiple portions of the digital data to transfer from the source device to the target device. For copying multiple pieces of content, and in the situation where fingerprint and/or eye-tracking is used to track the actions of the user, there may be provided the ability to copy multiple portions of content and allow the user to bundle several transfer activities. If the user uses a finger in the selection or authentication relative to a piece of information, the user can use different fingers to associate with different content. For example, the user could use his/her left hand index finger to select/copy/authenticate when indicating a first portion of the digital data (e.g. date of birth) and his/her right hand index finger to select/copy/authenticate when indicating a second portion of the digital data (e.g. a passport number). A different gesture, finger, or fingerprint associated with a particular selection is a selection characteristic of the separate user selection. Then, when initiating the transfer to the target device, each such separate user selection may be used to transmit the associated portion of digital data to paste to the target device. This gives the user control to choose the particular content to be pasted to particular target fields, and the particular sequence when pasting the content to target device.

In a particular example where the user copies five items from the source to the target device, the user selects a first field on the source device, the source reads the field and the data therein is stored against the first finger as the selection characteristic of that selection. The fact that the selection was made with that finger, the gesture was made with that finger, or that finger's fingerprint was used to authenticate after the user selected that data, may serve as the selection characteristic. Data from a second field is stored against a second finger, and so on until the five pieces of information are stored. 'Stored' in this context can refer to buffering that data on the source device or on the smart eyewear device after a transfer thereof to the smart eyewear, as examples. Based on recognizing a selection of a target input field of the target device, for instance if the target identifies a selection or authentication with a finger, the target device can identify the finger and reach out to the smart eyewear or source device and request the data associated with that selection characteristic (the first finger). Alternatively, the copied data may be pre-transferred to the target device and the target device could reach into this buffered data to pull the portion associated with that selection characteristic.

As an alternative, a number of blinks the user performs when selecting data may be a selection characteristic associated with that data. The user could select data and execute a given number of blinks to store that data against that number of blinks. The user can then direct which portion of data is to be copied to a given target input field by staring at that input field and performing the number of blinks associated with that data. By way of specific example, the user could select date of birth information on the source interface and blink once, then select passport number on the source interface and blink twice. Then, the user could gaze at a first input field on the target interface and blink twice to cause a transfer/fill of the passport number to that input field of the target device. Blinking once while looking at a target input field will transmit/fill that input field with the user's data of birth information.

Figure 2:
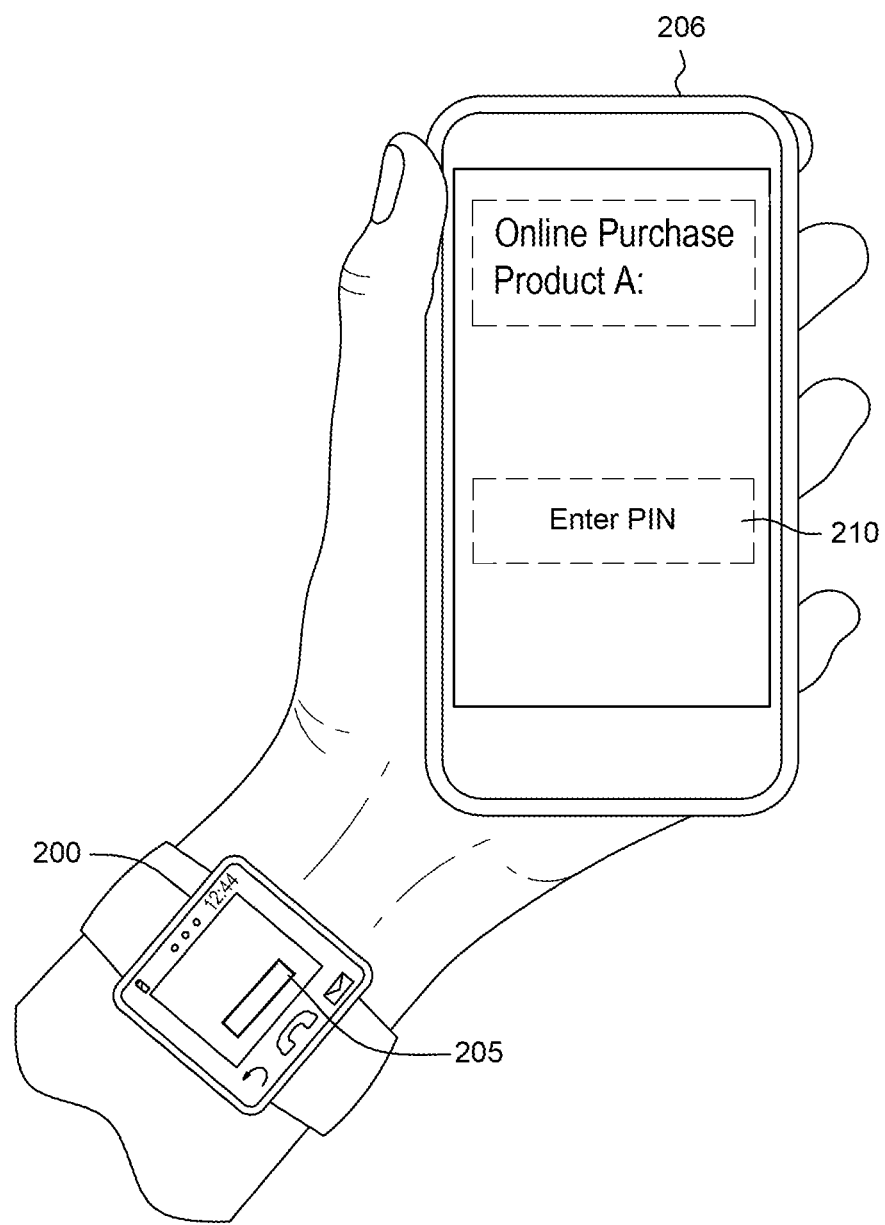

FIG. 2 depicts another example environment having source and target devices between which a transfer of digital data occurs in accordance with aspects described herein. FIG. 2 is similar to FIG. 1 in that a user desires to transfer digital data from a source device (smartwatch 200) to a target device (smartphone 206). Here, the user selects digital data 205 using a finger, gesture, or by gazing at the digital data (in the case that an eye tracking facility in one of the devices 202, 206 and/or smart eyewear is provided) and selecting target input field 210 of the smartphone 206, where the user is to enter the user's PIN to completed an online product purchase. The data is transferred directly from the smartwatch 200 to smartphone 206 over a Bluetooth, Wi-Fi or near-field communication (NFC) connection, as examples, or is provided through an intermediary device (not pictured), for instance smart eyewear by way of a Li-Fi data transfer from smartwatch 200 to the eyewear, and a Li-Fi data transfer from the eyewear to smartphone 206.

Figure 3:
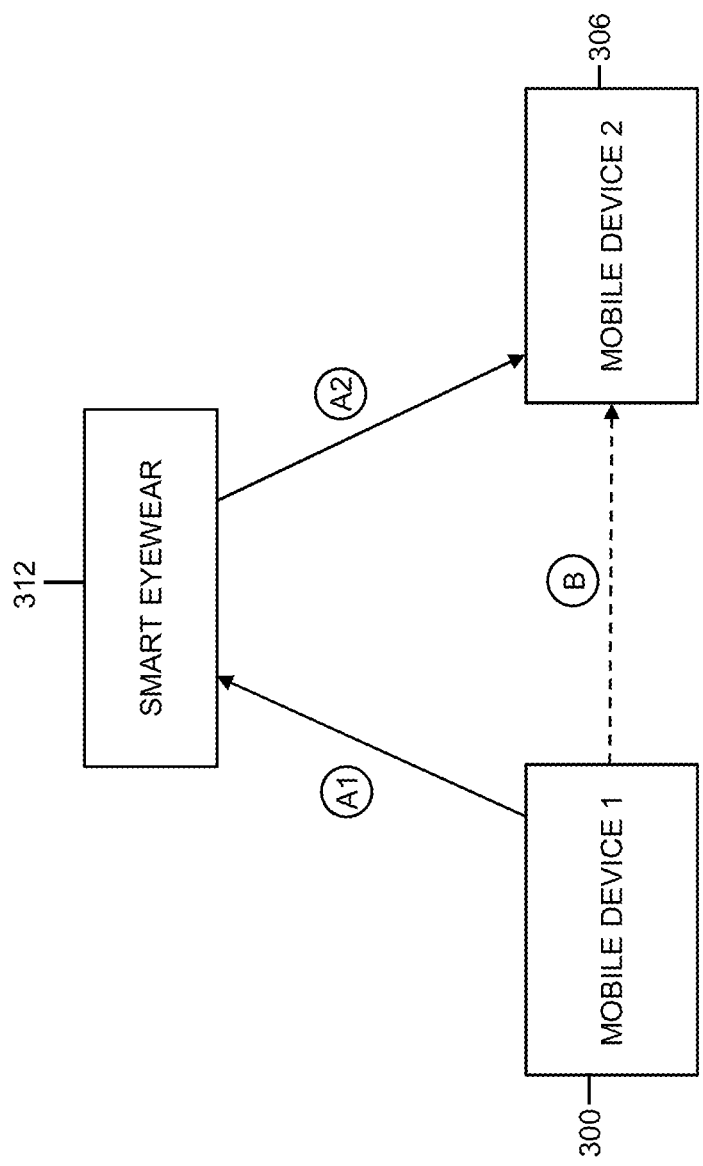

FIG. 3 depicts an example environment having source, target, and smart eyewear devices between which a transfer of digital data occurs in accordance with aspects described herein. FIG. 3 present a conceptual diagram showing options to transfer the digital data. The environment may be a computer system that includes several components, each of which may be different computers/devices. Individual computers/devices may themselves be referred to as computer systems.

FIG. 3 shows source device 300 (mobile device 1) and target device 306 (mobile device 2). Smart eyewear device 312 is in communication with each of mobile devices 1 and 2. The communication labeled A1 shows Li-Fi communication between mobile device 1 and smart eyewear, and the communication labeled A2 shows Li-Fi communication between smart eyewear device 312 and mobile device 2. In one embodiment, transfer of digital data occurs between mobile devices 1 and 2 with a first communication (A1) transferring the digital data to smart eyewear device 312. The smart eyewear device 312 receives the data and at least temporarily stores it, for example pending user selection and authentication on mobile device 2 to complete the transfer. A second communication (A2) transfers the data from the smart eyewear device 312 to mobile device 2.

Additionally or alternatively, digital data may be transferred directly between mobile device 1 and 2. Communication B from mobile device 1 to mobile device 2 is a Bluetooth, direct Wi-Fi, or other NFC communication path, as examples.

Aspects described herein differ from approaches that make use of the exchange of biometric information when authenticating a host to another device for data transfer, e.g. situations where a sending device sends biometric signals to a receiving device and the receiving device matches the biometric signals with biometric signals stored on the receiving device. While some aspects described above make use of biometric authentication (fingerprint scanning, retina scanning) to authenticate the user for sending information from the source device to the target device, this is used in authenticating whether the information requested for transfer belongs to a same user who copied the content from the source device. In other words, the authentication on the two devices can help verify it is a common (i.e. same) user performing the selections on the source and target devices.

In a specific embodiment, the user provides an automated teller machine (ATM) personal identification number (PIN) to an ATM machine without physically typing the user's PIN via any physical or virtual keypad of the ATM. This might avoid a hacking incident and/or an attempt by individuals to observe the user's physical selection of the PIN characters of the ATM keypad. In this embodiment, as an example, the user loads the user's PIN on an interface of a source device, selects that PIN as digital data, selects a target input field of the ATM (i.e. the PIN input field), and invokes the automated transfer of the digital data to the ATM's interface and population into the PIN input field.

Sensitive or other information can therefore be provided from one device to another without relying on the user to correctly remember and enter it. Example sensitive information includes PINs, Permanent Account Numbers (PANs), credit card numbers or verification codes, and social security numbers, as examples.

Additionally, while authenticating a user on the source and target devices, the system can store audit information including user information, date/time, device information, and in some examples the copied content itself, to aid in auditing and other subsequent activities if desired.

Figure 4A:
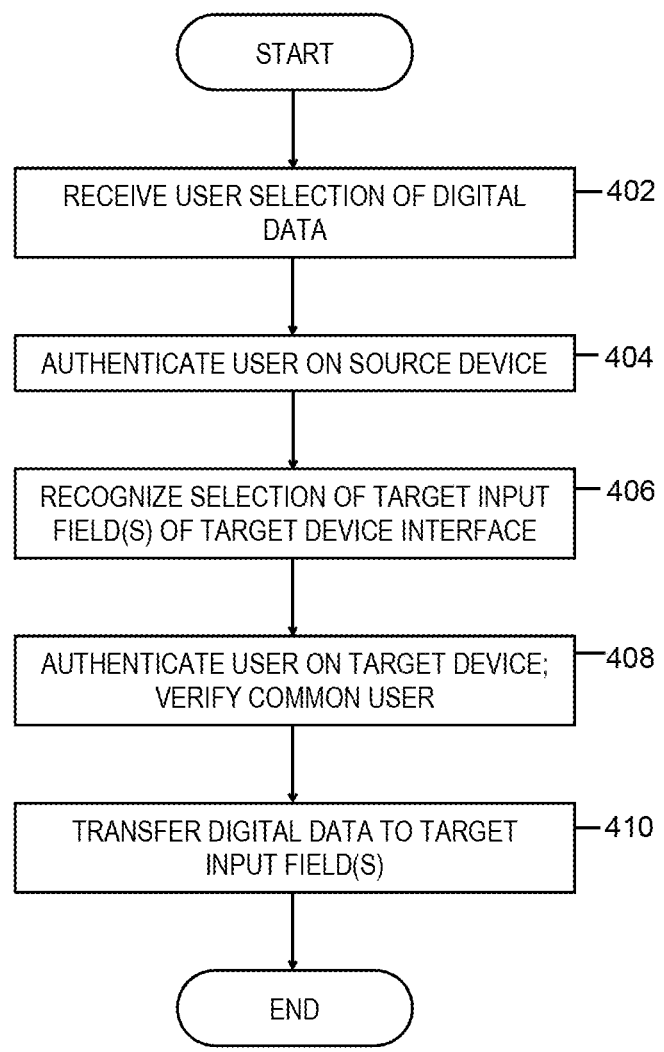
FIGS. 4A-4B depict an example process for transferring digital data from a source device to a target device in accordance with aspects described herein.

Accordingly, FIG. 4 depicts an example process for transferring digital data from a source device to a target device in accordance with aspects described herein, each of the source and target devices including a respective user interface. In some examples, the process is performed by various components of a computer system that includes at least the source and target devices, which themselves may individually be one or more computer systems, such as those described herein, which may include one or more mobile devices, such as laptops, tablets, smartphones, smartwatches, or wearable devices, as examples.

The process begins by receiving a user selection of digital data on the source device via a user interface of the source device (402). The selection may be received based on the user touching the content, performing gesture(s), gazing at the content, or the like. The process then authenticates the user on the source device (404), for instance by way of a biometric-data-based authentication, such as a fingerprint authentication and/or retina-scan authentication. The method continues by recognizing user selection of target input field(s), of an interface of the target device, to which the digital data is to be provided as input (406). User selection of the target input field(s) includes, in some examples, the user gazing at the target input field(s) or selecting the target input field(s) using one or more fingers of the user.

The process also includes, based on recognizing the user selection of the target input field(s), authenticating the user on the target device and verifying that a common user has authenticated with the source device and the target device (408). The authenticating the user on the source device and the authenticating the user on the target device may each include a biometric-data-based authentication, for instance a retina scan using a smart eyewear device of the user. The process of FIG. 4A also transfers the digital data to the target input field(s) of the interface of the target device (410), and ends. The transferring can include transferring the digital data from the source device directly to the target device via a wireless communication channel directly from the source device to the target device, as one example.

The digital data includes a plurality of portions in some examples. The user selection of the digital data on the source device can therefore include a plurality of separate user selections, each separate user selection of the plurality of separate user selections being of a respective portion of the plurality of portions of the digital data. Different selected portions can also be associated with different selections that the user makes, for instance specific selection characteristics used in each of the selections. For instance, a number of eye blinks or a particular finger used to effect a selection may be a selection characteristic. Thus, the process of FIG. 4A could include, for each separate user selection of the plurality of separate user selections, associating the respective portion of the digital data with a selection characteristic of the separate user selection, where the transferring performs a plurality of transfers, including, at each transfer of the plurality of transfers, (i) recognizing the selection characteristic of the separate user selection in conjunction with a separate user selection of a respective input field, of the target input field(s), of the interface of the target device, and (ii) providing the respective portion, of the digital data, that is associated with that recognized selection characteristic to the respective input field.

Each selection characteristic may be selected from the group consisting of: (i) a user gesture, comprising a number of eye blinks or a user hand gesture, and (ii) an identification of a particular finger of the user, as examples.

Figure 4B:
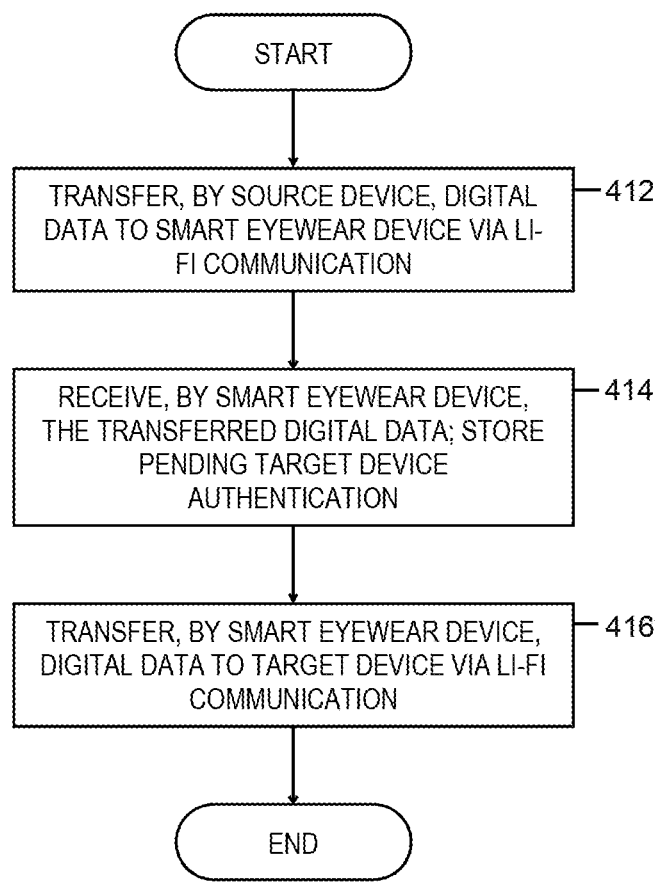

FIG. 4B depicts a specific example of transferring the digital data from a source device to a target device via smart eyewear, in accordance with aspects described herein. Specifically, the process of FIG. 4B includes transferring, by the source device in a first transfer, the digital data to a smart eyewear device of the user via Li-Fi communication (412), and receiving, by the smart eyewear device, the transferred digital data and at least temporarily storing at least a portion of the digital data for transfer to the target device pending the authenticating the user on the target device (414). In this manner, the digital data may be temporarily held on the smart eyewear device until the user properly authenticates to the target device. The process of FIG. 4B also transfers, by the smart eyewear device in a second transfer, the digital data to the target device via Li-Fi communication (416).

The smart eyewear device can include a smart contact lens, the smart contact lens being a computer system that includes a processor and memory configured to at least temporarily store the received portion of the digital data.

Additionally, as noted, transferring the digital data to the smart eyewear device (#412 in FIG. 4B) can transfer the digital data to the smart contact lens via Li-Fi communication, and the transferring the digital data to the target device can transfer the digital data via Li-Fi communication.

In some aspects, recognizing the user selection of the target input field(s) (i.e. #406 of FIG. 4A) can include tracking eye movement of the user to identify a gaze direction of the user and identifying the target input field(s) as being a target of the gaze direction of the user.

Although various examples are provided, variations are possible without departing from a spirit of the claimed aspects.

Figure 5:
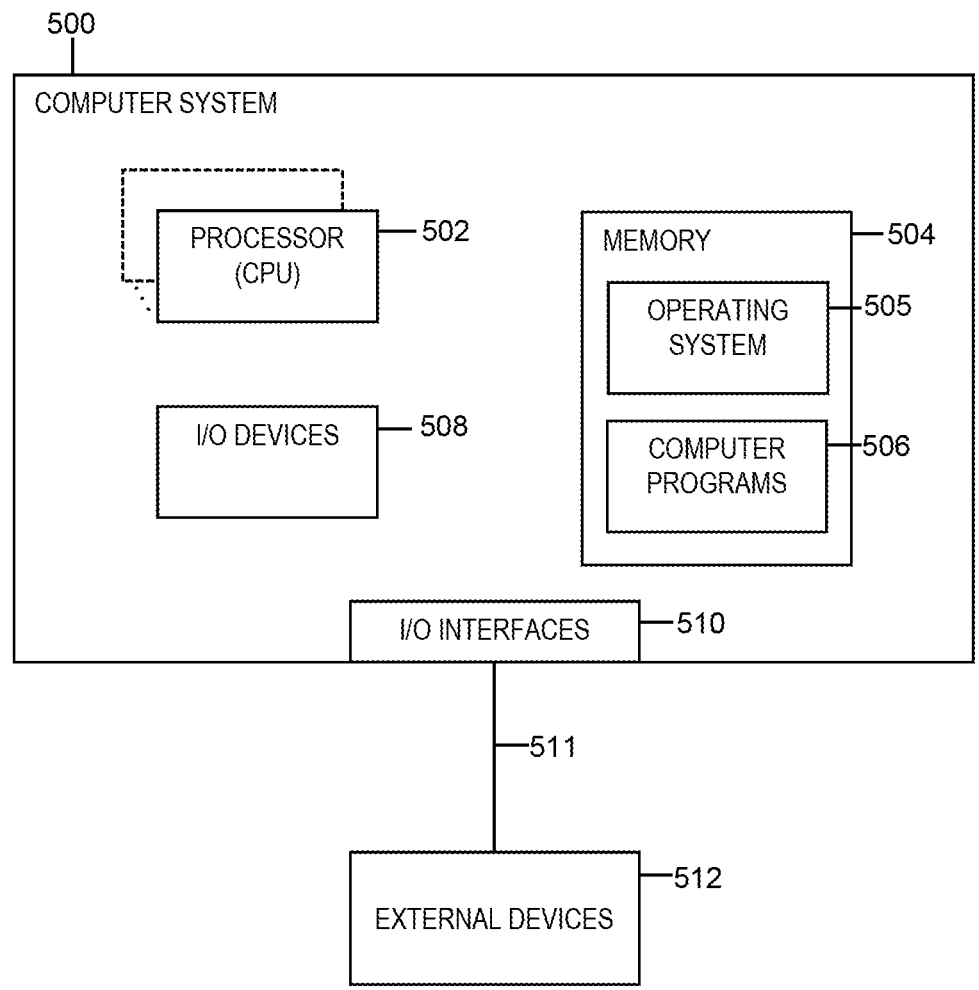
FIG. 5 depicts one example of a computer system and associated devices to incorporate and/or use aspects described herein.

Processes described herein may be performed singly or collectively by one or more computer systems, such as one or more mobile devices. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples. Additionally a "computer system" as used herein can include multiple individual computer systems in communication with each other.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s) such as smart eyewear device, such as contact lenses with processing an memory components, multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Figure 6:
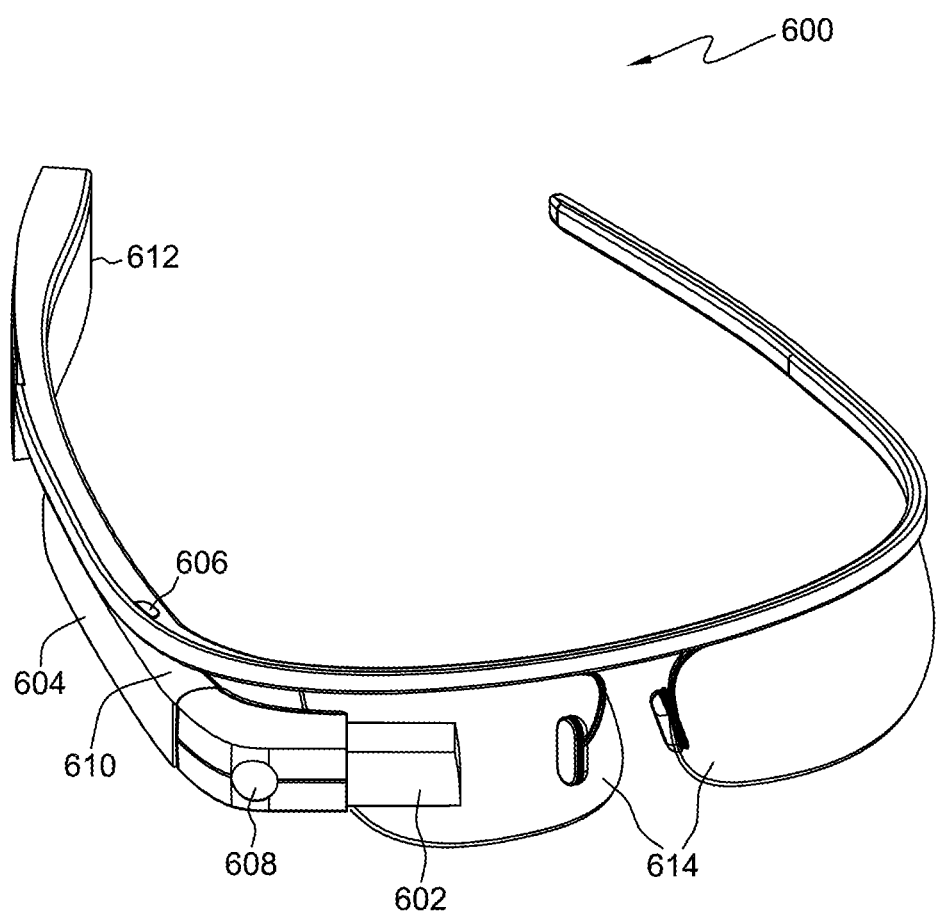
FIG. 6 depicts one example of a smart eyewear device.

FIG. 6 depicts another example of a computer system to incorporate and use aspects described herein. FIG. 6 depicts an example eyewear based wearable device. Device 600 can include many of the same types of components included in computer system 500 described above. In the example of FIG. 6, device 600 is configured to be wearable on the head of the device user. The device includes a display 602 that is positioned in a peripheral vision line of sight of the user when the device is in operative position on the user's head. Suitable displays can utilize LCD, CRT, or OLED display technologies, as examples. Lenses 614 may optionally include active translucent displays, in which an inner and/or outer surface of the lenses are capable of displaying images and other content. This provides the ability to impose this content directly into the line of sight of the user, overlaying at least part of the user's view to the environment through the lenses. In particular embodiments described herein, content presented on the lens displays are video portions that provide an unobstructed view of a scene by overlaying with this video portions areas of the user's view that include an obstructed view to the scene.

Device 600 also includes touch input portion 604 that enable users to input touch-gestures in order to control functions of the device. Such gestures can be interpreted as commands, for instance a command to take a picture, or a command to launch a particular service. Device 600 also includes button 606 in order to control function(s) of the device. Example functions include locking, shutting down, or placing the device into a standby or sleep mode.

Various other input devices are provided, such as camera 608, which can be used to capture images or video. The camera can be used by the device to obtain an image of the user's view of his or her environment to use in, for instance, capturing images/videos of a scene. Additionally, camera(s) may be used to track the user's direction of eyesight and ascertain where the user is looking, and track the user's other eye activity, such as blinking or movement.

One or more microphones, proximity sensors, light sensors, accelerometers, speakers, GPS devices, and/or other input devices (not labeled) may be additionally provided, for instance within housing 610. Housing 610 can also include other electronic components, such as electronic circuitry, including processor(s), memory, and/or communications devices, such as cellular, short-range wireless (e.g. Bluetooth), or Wi-Fi circuitry for connection to remote devices. Housing 610 can further include a power source, such as a battery to power components of device 600. Additionally or alternatively, any such circuitry or battery can be included in enlarged end 612, which may be enlarged to accommodate such components. Enlarged end 612, or any other portion of device 600, can also include physical port(s) (not pictured) used to connect device 600 to a power source (to recharge a battery) and/or any other external device, such as a computer. Such physical ports can be of any standardized or proprietary type, such as Universal Serial Bus (USB).

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 7:
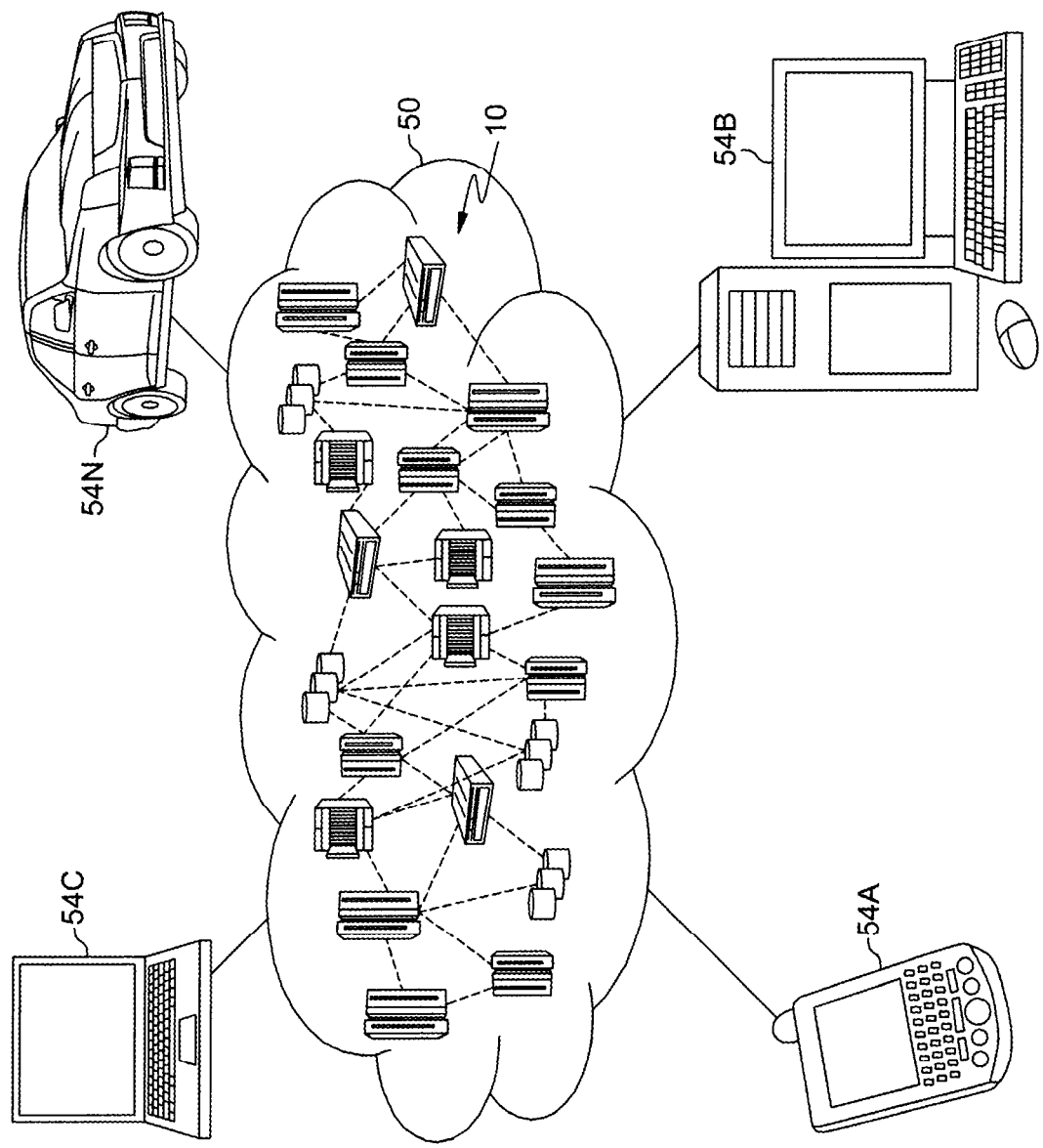
FIG. 7 depicts a cloud computing environment according to an embodiment of the present invention.

Referring now to FIG. 7, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
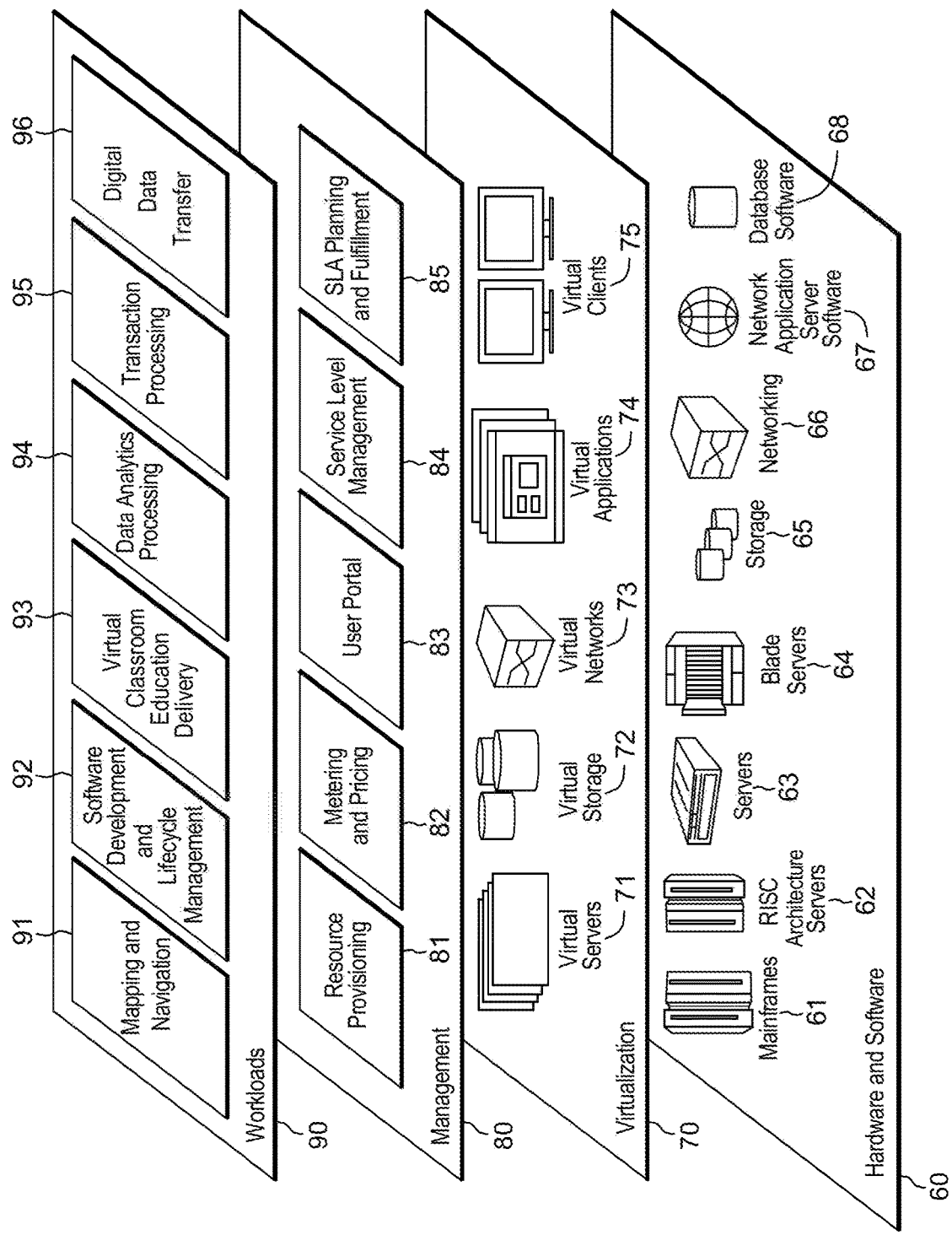
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital data transfer 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for transferring digital data from a source device to a target device, each of the source and target devices comprising a respective user interface, the method comprising:
    authenticating, by the source device, a user on the source device to authenticate the user for transferring the digital data from the source device to the target device;
    recognizing a user selection of at least one target input field, of an interface of the target device, to which the digital data is to be provided as input;
    authenticating the user on the target device and verifying that a common user has authenticated with the source device and the target device based on the recognizing; and
    transferring the digital data to the at least one target input field of the interface of the target device, the transferring comprising transferring a plurality of data portions of the digital data, wherein transferring a data portion of the plurality of data portions of the digital data comprises:
        recognizing, in conjunction with a user selection of a target input field, of the at least one target input field, of the interface of the target device, a selection characteristic of the user selection of the target input field and that the selection characteristic is associated the data portion; and
        providing the data portion associated with that recognized selection characteristic to the selected target input field of the interface of the target device.

2. The method of claim 1, wherein the transferring the digital data comprises:
    transferring, by the source device in a first one or more transfers, the digital data to a smart eyewear device of the user; and
    transferring, by the smart eyewear device in a second one or more transfers, the digital data to the target device.

3. The method of claim 2, further comprising receiving, by the smart eyewear device, the transferred digital data, and at least temporarily storing at least some of the digital data for transfer to the target device pending the authenticating the user on the target device.

4. The method of claim 3, wherein the smart eyewear device comprises a smart contact lens, the smart contact lens comprising a processor and memory configured to at least temporarily store the received at least some of the digital data.

5. The method of claim 4, wherein the transferring the digital data to the smart eyewear device transfers the digital data to the smart contact lens via Li-Fi communication, and the transferring the digital data to the target device transfers the digital data via Li-Fi communication.

6. The method of claim 2, wherein the recognizing the user selection of the at least one target input field comprises tracking eye movement of the user to identify a gaze direction of the user and identifying the at least one target input field as being a target of the gaze direction of the user.

7. The method of claim 1, wherein the transferring comprises transferring the digital data from the source device directly to the target device via a wireless communication channel directly from the source device to the target device.

8. The method of claim 1, further comprising receiving, on the source device, via a user interface of the source device, a user selection of the digital data presented on the source device, wherein the user selection of the digital data presented on the source device comprises a plurality of separate user selections, each separate user selection of the plurality of separate user selections being of a respective data portion of the plurality of data portions of the digital data.

9. The method of claim 8, further comprising, for each separate user selection of the plurality of separate user selections:
    associating the respective data portion of the plurality of data portions of the digital data with a selection characteristic of the separate user selection, wherein the transferring the plurality of data portions of the digital data performs a plurality of transfers to provide the plurality of data portions to the interface of the target device.

10. The method of claim 9, wherein the selection characteristic associated with a data portion of the plurality of data portions is selected from the group consisting of: (i) a user gesture, comprising a number of eye blinks or a user hand gesture, and (ii) an identification of a particular finger of the user.

11. The method of claim 1, wherein the authenticating the user on the source device and the authenticating the user on the target device each comprise a biometric-data-based authentication, the biometric-data-based-authentication comprising a retina scan using a smart eyewear device of the user.

12. The method of claim 1, wherein the user selection of the at least one target input field comprises the user gazing at the at least one target input field or selecting the at least one target input field using one or more fingers of the user.

13. A computer system comprising a source device and a target device, the computer system being configured to perform a method for transferring digital data from the source device to the target device, each of the source and target devices comprising a respective user interface, and the method comprising:
    authenticating, by the source device, a user on the source device to authenticate the user for transferring the digital data from the source device to the target device;

recognizing a user selection of at least one target input field, of an interface of the target device, to which the digital data is to be provided as input;

authenticating the user on the target device and verifying that a common user has authenticated with the source device and the target device based on the recognizing; and transferring the digital data to the at least one target input field of the interface of the target device, the transferring comprising transferring a plurality of data portions of the digital data, wherein transferring a data portion of the plurality of data portions of the digital data comprises:

recognizing, in conjunction with a user selection of a target input field, of the at least one target input field, of the interface of the target device, a selection characteristic of the user selection of the target input field and that the selection characteristic is associated the data portion; and providing the data portion associated with that recognized selection characteristic to the selected target input field of the interface of the target device.

14. The computer system of claim 13, wherein the transferring the digital data comprises transferring, by the source device in a first one or more transfers, the digital data to a smart eyewear device of the user, and transferring, by the smart eyewear device in a second one or more transfers, the digital data to the target device, wherein the method further comprises receiving, by the smart eyewear device, the transferred digital data, and at least temporarily storing at least some of the digital data for transfer to the target device pending the authenticating the user on the target device, and wherein the smart eyewear device comprises a smart contact lens, the smart contact lens comprising a processor and memory configured to at least temporarily store the received at least some of the digital data.

15. The computer system of claim 13, wherein the transferring comprises transferring the digital data from the source device directly to the target device via a wireless communication channel directly from the source device to the target device.

16. The computer system of claim 13, further comprising receiving, on the source device, via a user interface of the source device, a user selection of the digital data presented on the source device, wherein the user selection of the digital data presented on the source device comprises a plurality of separate user selections, each separate user selection of the plurality of separate user selections being of a respective data portion of the plurality of data portions of the digital data, and wherein the method further comprises, for each separate user selection of the plurality of separate user selections:

associating the respective data portion of the plurality of data portions of the digital data with a selection characteristic of the separate user selection, wherein the transferring the plurality of data portions of the digital data performs a plurality of transfers to provide the plurality of data portions to the interface of the target device.

17. A computer program product comprising:
a computer readable storage medium readable by one or more processors and storing instructions for execution by the one or more processors for performing a method for transferring digital data from a source device to a target device, each of the source and target devices comprising a respective user interface, the method comprising:

authenticating, by the source device, a user on the source device to authenticate the user for transferring the digital data from the source device to the target device;

recognizing a user selection of at least one target input field, of an interface of the target device, to which the digital data is to be provided as input;

authenticating the user on the target device and verifying that a common user has authenticated with the source device and the target device based on the recognizing; and transferring the digital data to the at least one target input field of the interface of the target device, the transferring comprising transferring a plurality of data portions of the digital data, wherein transferring a data Portion of the plurality of data portions of the digital data comprises:

recognizing, in conjunction with a user selection of a target input field, of the at least one target input field, of the interface of the target device, a selection characteristic of the user selection of the target input field and that the selection characteristic is associated the data portion; and providing the data portion associated with that recognized selection characteristic to the selected target input field of the interface of the target device.

18. The computer program product of claim 17, wherein the transferring the digital data comprises transferring, by the source device in a first one or more transfers, the digital data to a smart eyewear device of the user, and transferring, by the smart eyewear device in a second one or more transfers, the digital data to the target device, wherein the method further comprises receiving, by the smart eyewear device, the transferred digital data, and at least temporarily storing at least some of the digital data for transfer to the target device pending the authenticating the user on the target device, and wherein the smart eyewear device comprises a smart contact lens, the smart contact lens comprising a processor and memory configured to at least temporarily store the received at least some of the digital data.

19. The computer program product of claim 17, wherein the transferring comprises transferring the digital data from the source device directly to the target device via a wireless communication channel directly from the source device to the target device.

20. The computer program product of claim 17, further comprising receiving, on the source device, via a user interface of the source device, a user selection of the digital data presented on the source device, wherein the user selection of the digital data presented on the source device comprises a plurality of separate user selections, each separate user selection of the plurality of separate user selections being of a respective data portion of the plurality of data portions of the digital data, and wherein the method further comprises, for each separate user selection of the plurality of separate user selections:

associating the respective data portion of the plurality of data portions of the digital data with a selection characteristic of the separate user selection, wherein the transferring the plurality of data portions of the digital data performs a plurality of transfers to provide the plurality of data portions to the interface of the target device.

* * * * *